US012017466B2

(12) United States Patent
Sato et al.

(10) Patent No.: US 12,017,466 B2
(45) Date of Patent: Jun. 25, 2024

(54) TRANSPORT DEVICE AND RECORDING DEVICE

(71) Applicant: SEIKO EPSON CORPORATION, Tokyo (JP)

(72) Inventors: Koji Sato, Shiojiri (JP); Yoshihisa Horikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 17/645,558

(22) Filed: Dec. 22, 2021

(65) Prior Publication Data
US 2022/0203733 A1     Jun. 30, 2022

(30) Foreign Application Priority Data
Dec. 25, 2020 (JP) ................................ 2020-216436

(51) Int. Cl.
*B41J 29/17*     (2006.01)
*B65G 45/16*    (2006.01)
*B65H 5/02*      (2006.01)

(52) U.S. Cl.
CPC .............. *B41J 29/17* (2013.01); *B65G 45/16* (2013.01); *B65H 5/021* (2013.01); *B65H 2301/531* (2013.01)

(58) Field of Classification Search
CPC .......... B41J 29/17; B65G 45/10; B65G 45/12; B65G 45/16; B65H 5/021; B65H 2301/531
USPC ....... 347/22, 33; 198/497, 498, 499; 474/92; 15/256.5
See application file for complete search history.

(56) References Cited

U.S. PATENT DOCUMENTS

| 3,795,308 | A  | * | 3/1974  | Oury      | B65G 45/16  |
|           |    |   |         |           | 198/499     |
| 4,036,351 | A  | * | 7/1977  | Reiter    | B65G 45/16  |
|           |    |   |         |           | 137/124     |
| 5,367,363 | A  | * | 11/1994 | Kai       | G03G 21/1821|
|           |    |   |         |           | 399/21      |
| 6,457,575 | B2 | * | 10/2002 | Swinderman| B65G 45/12  |
|           |    |   |         |           | 198/497     |
| 7,367,443 | B2 | * | 5/2008  | Swinderman| B65G 45/16  |
|           |    |   |         |           | 198/497     |
| 7,901,030 | B2 | * | 3/2011  | Miyata    | B65H 5/021  |
|           |    |   |         |           | 399/350     |
| 9,242,805 | B2 | * | 1/2016  | DeVries   | B65G 45/12  |
| 9,308,759 | B2 | * | 4/2016  | Ishizuka  | B41J 11/007 |

FOREIGN PATENT DOCUMENTS

JP         2012-116619 A        6/2012

\* cited by examiner

*Primary Examiner* — Leslie A Nicholson, III
(74) *Attorney, Agent, or Firm* — WORKMAN NYDEGGER

(57) ABSTRACT

Provided are a transporting belt including a support face configured to support a medium, the transporting belt being configured to transport the medium; a wiper configured to wipe the support face; an attachment portion to which the wiper is attached; and a holding portion configured to switch between a pressing state in which the wiper is pressed against the attachment portion and a release state in which the pressure of the wiper against the attachment portion is released, in which the wiper includes a base portion attached to the attachment portion, either one of the base portion and the attachment portion includes at least one pin, and the other one includes a hole through which the at least one pine is inserted.

7 Claims, 12 Drawing Sheets

TRANSPORT DEVICE AND RECORDING DEVICE

The present application is based on, and claims priority from JP Application Serial Number 2020-216436, filed on Dec. 25, 2020, the disclosure of which is hereby incorporated by reference herein in its entirety.

BACKGROUND

1. Technical Field

The present disclosure relates to a transport device including a belt that can transport a medium, and a recording device including the transport device.

2. Related Art

One example of such a transport device includes a transport device described in JP-A-2012-116619. This transport device includes a secondary blade 42 disposed between a holding plate 424 and a pressing adjustment plate 421. The holding plate 424 is locked and released using a cam member 421c provided at the pressing adjustment plate 421 and configured to press (lock) and release the holding plate 424. Specifically, at the time of lock, the holding plate 424 is pressed against the pressing adjustment plate 421, and compression between the holding plate 424 and the pressing adjustment plate 421 is used to fix the secondary blade 42. On the other hand, at the time of release, the pressure of the holding plate 424 against the pressing adjustment plate 421 is released to release the fixing of the secondary blade 42.

With this configuration, the cam member 421c is operated to rotate from the state illustrated in FIG. 10 to release the lock. In addition, the pressure of the secondary blade 42 with the holding plate 424 is released, and the secondary blade 42 can be detached from between the holding plate 424 and the pressing adjustment plate 421.

With the transport device described in JP-A-2012-116619, when the pressure of the holding plate 424 against the pressing adjustment plate 421 is released at the time of replacing the secondary blade 42, the secondary blade 42 is more likely to fall under its own weight. At the time of replacing the secondary blade 42, this falling causes a deterioration of the workability of replacing.

SUMMARY

In order to solve the problem described above, a transport device according to the present disclosure includes a transporting belt including a support face configured to support a medium, the transporting belt being configured to transport the medium, a wiper configured to wipe the support face, an attachment portion to which the wiper is attached, and a holding portion configured to switch between a pressing state in which the wiper is pressed against the attachment portion and a release state in which the pressure of the wiper against the attachment portion is released, in which the wiper includes a base portion attached to the attachment portion, either one of the base portion and the attachment portion includes at least one pin, and the other one includes a hole through which the at least one pin is inserted.

In addition, a recording device according to the present disclosure includes a recording unit configured to perform recording on a medium and a transport device configured to transport the medium, in which the transport device includes a transporting belt including a support face configured to support a medium, the transporting belt being configured to transport the medium, a wiper configured to wipe the support face, an attachment portion to which the wiper is attached, and a holding portion configured to switch between a pressing state in which the wiper is pressed against the attachment portion and a release state in which the pressure of the wiper against the attachment portion is released, the wiper includes a base portion attached to the attachment portion, either one of the base portion and the attachment portion includes at least one pin, and the other one includes a hole through which the at least one pin is inserted.

DESCRIPTION OF EXEMPLARY EMBODIMENTS

Figure 1:
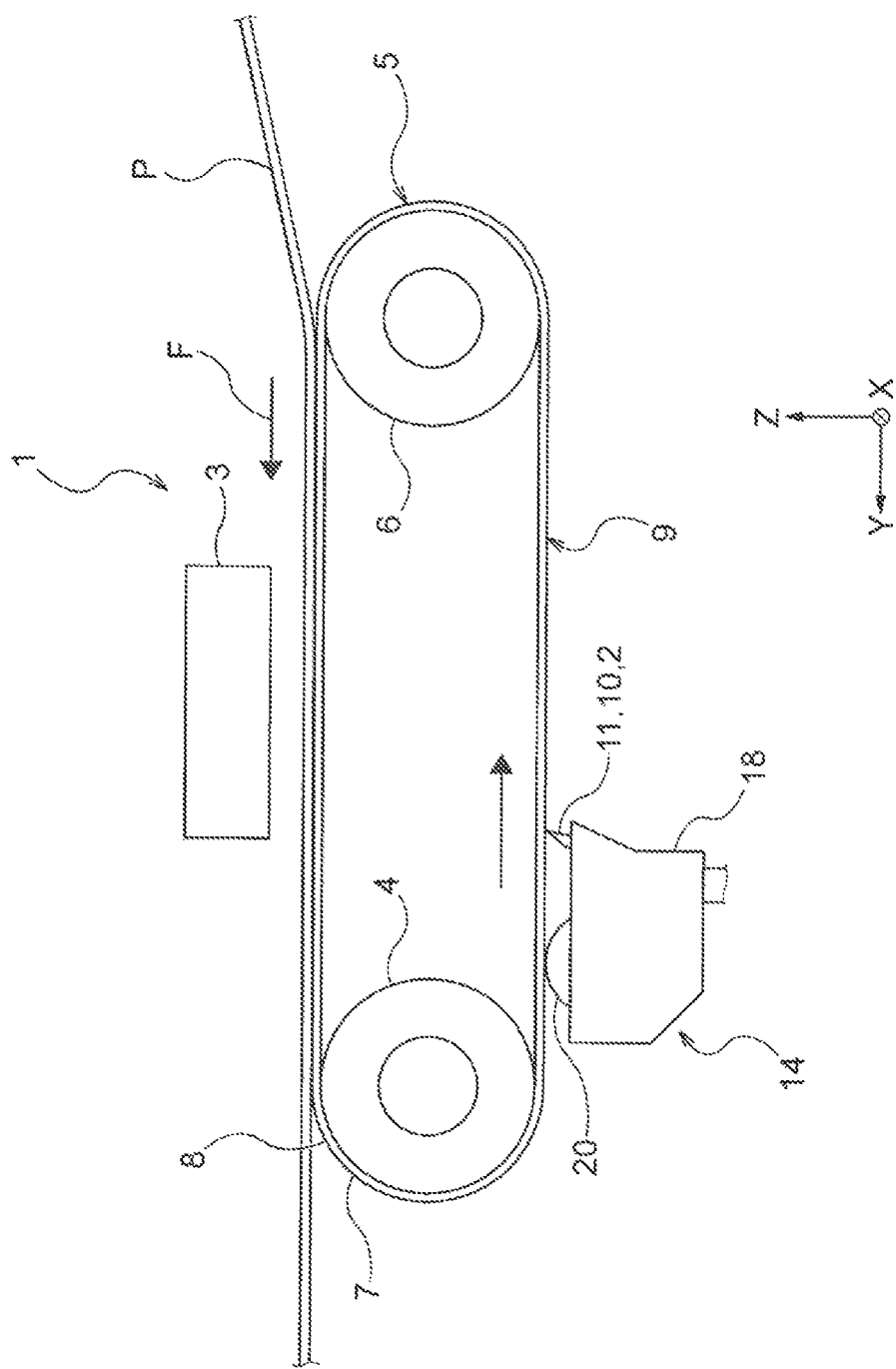
FIG. 1 is a side view schematically illustrating main components of a recording device including a transport device according to a first embodiment of the present disclosure.

First, the present disclosure will be schematically described below.

In order to solve the problem described above, a first aspect of a transport device according to the present disclosure includes: a transporting belt including a support face configured to support a medium, the transporting belt being configured to transport the medium; a wiper configured to wipe the support face; an attachment portion to which the wiper is attached; and a holding portion configured to switch between a pressing state in which the wiper is pressed against the attachment portion and a release state in which the pressure of the wiper against the attachment portion is released, in which the wiper includes a base portion attached to the attachment portion, either one of the base portion and the attachment portion includes at least one pin, and the other one includes a hole through which the at least one pin is inserted.

With this aspect, the at least one pin is provided at either one of the base portion and the attachment portion, and the pin is inserted through the hole provided at the other one. This causes the pin to be caught at the hole, which makes it possible to suppress falling of the wiper under the wiper's own weight even if the holding portion switches into the release state at the time of replacing the wiper. Thus, it is possible to suppress a deterioration of workability of replacing the wiper.

In the first aspect, the transport device according to a second aspect of the present disclosure is configured such that the pin includes a first pin and a second pin configured to be inserted through the hole, the first pin and the second pin are provided at the attachment portion, the hole is provided in the base portion, and in a state where the first pin and the second pin are inserted through the hole, the first pin and the second pin press an inner wall that constitutes the hole, in directions differing from each other.

With this aspect, in a state where the first pin and the second pin are inserted through the hole, the first pin and the second pin press the inner wall that constitutes the hole with pressing force in directions differing from each other. This makes it possible to further suppress falling of the wiper under its own weight even if the holding portion switches into the release state at the time of replacing the wiper. Thus, it is possible to further suppress a deterioration of workability of replacing the wiper.

In the first or second aspect, the transport device according to a third aspect of the present disclosure is configured such that a portion of the holding portion that is in contact with the base portion includes a protrusion and a recession.

When the holding portion is switched into the release state, the holding portion may adhere to the wiper depending on a type of a material that constitutes the wipe.

With the present aspect, the portion of the holding portion that is in contact with the base portion includes a protrusion and a recession. This makes the wiper less likely to adhere to the holding portion. Thus, it is possible to suppress falling of the wiper due to detachment from the holding portion resulting from the adherence.

In any one aspect of the first to third aspects, the transport device according to a fourth aspect of the present disclosure is configured such that the pressing unit includes a slide portion that can slidably move relative to the attachment portion, and a protruding portion provided at a portion of the slide portion that is opposed to the base portion, in which, with the slide portion sliding and moving, the protruding portion moves to a position where the base portion is configured to be pressed against the attachment portion.

With this aspect, it is possible to cause the base portion to be pressed against the attachment portion only by sliding and moving, by a user, the slide portion. This makes it possible to improve the workability of replacing the wiper.

In the fourth aspect, the transport device according to a fifth aspect of the present disclosure is configured such that, in a state where the slide portion is slidably moved to the maximum extent relative to the attachment portion, the slide portion is locked at the attachment portion.

With this aspect, the slide portion is locked in a state of being is slidably moved to the maximum extent relative to the attachment portion. Thus, the slide portion is less likely to fall.

In the fourth or fifth aspect, the transport device according to a sixth aspect of the present disclosure includes a storage unit configured to store a liquid used to clean the support face, in which the attachment portion is supported inside the storage unit, and the slide portion includes a cover portion with which the at least one pin and the hole are covered.

With this aspect, it is possible to prevent that the liquid stored in the storage unit is attached to the base portion, and dirt enters a gap between the pin and the hole to make the wiper or the pin get dirty.

In the sixth aspect, the transport device according to a seventh aspect of the present disclosure is configured such that the cover includes a first opening that the wiper enters when slidably moving relative to the attachment portion, and a second opening disposed at an opposite side from the first opening in a direction of sliding and moving relative to the attachment portion, in which the second opening is disposed below the first opening in a gravitational direction.

With this aspect, the liquid that has been used to clean the support face moves along the wiper and flows through the second opening into the storage unit. This makes it possible to prevent the liquid from staying within the cover. Thus, it is possible to prevent the inside of the cover from getting dirty.

In any one of the first to seventh aspects, the transport device according to an eighth aspect of the present disclosure is configured such that the at least one pin includes a taper portion.

With this aspect, when the taper portion has a width reducing shape toward the tip, the pin can be more easily inserted through the hole. In addition, when the taper portion has a width increasing shape toward the tip, it is possible to further suppress falling of the wiper from the attachment portion under its own weight.

A recording device according to a ninth aspect of the present disclosure includes a recording unit configured to perform recording on a medium, and a transport device configured to transport the medium, in which the transport device includes: a transporting belt including a support face configured to support the medium, the transporting belt being configured to transport the medium; a wiper configured to wipe the support face; an attachment portion to which the wiper is attached; and a holding portion configured to switch between a pressing state in which the wiper is pressed against the attachment portion and a release state in which the pressure of the wiper against the attachment portion is released, the wiper includes a base portion attached to the attachment portion, either one of the base portion and the attachment portion includes at least one pin, and the other one includes a hole through which the at least one pin is inserted.

With this aspect, as the recording device, it is possible to obtain an effect similar to that of the first aspect.

First Embodiment

Below, a recording device including a transport device according to a first embodiment of the present disclosure will be described in detail with reference to FIGS. 1 to 4.

In the following description, three axes perpendicular to each other are set respectively as an X-axis, a Y-axis, and a Z-axis as illustrated in each of the drawings. The Z-axis direction corresponds to the vertical direction (a direction in which the gravity acts). The X-axis direction and the Y-axis direction each correspond to a horizontal direction. Here, the Y-axis direction corresponds to a transport direction of a medium, and the X-axis direction corresponds to a width direction of a medium that intersects the transport direction.

As illustrated in FIG. 1, a recording device 1 according to the present embodiment is an inkjet printer, and includes a recording unit 3 including a discharging head configured to discharge inks onto a medium P transported in a transport direction (Y-axis direction) F, and also includes a transport device 5 configured to transport the medium P.

Figure 2:
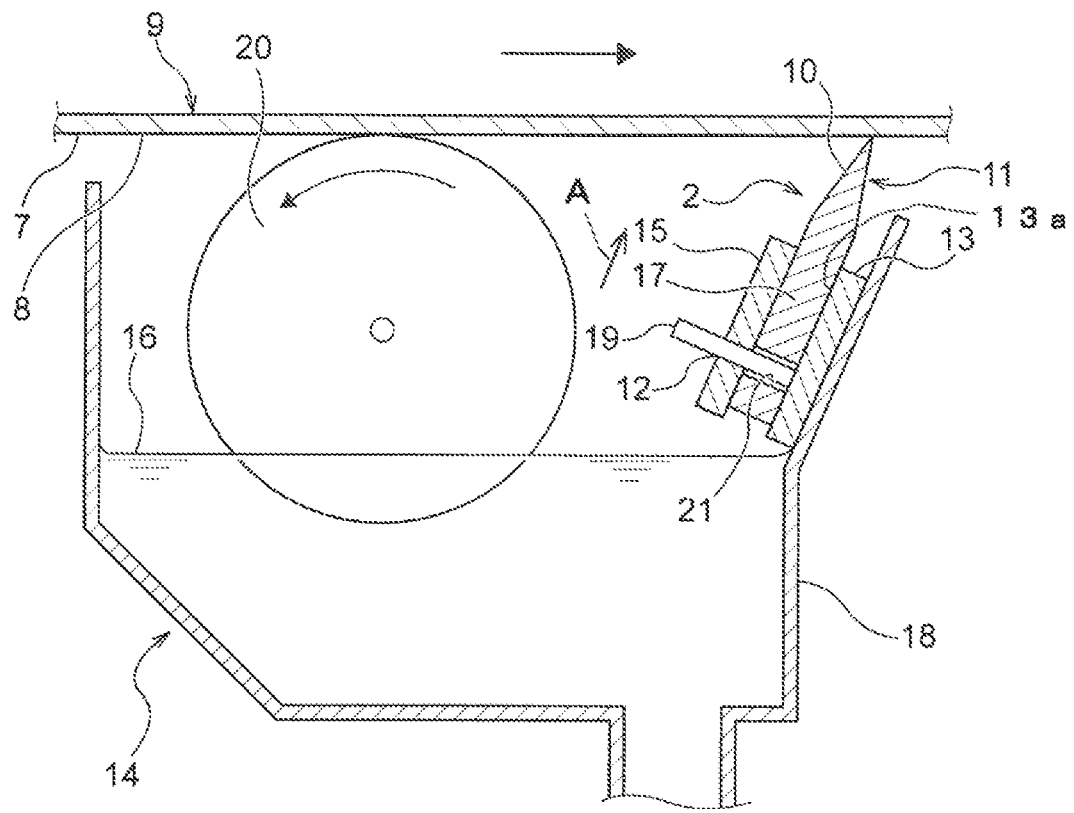
FIG. 2 is a cross-sectional view schematically illustrating a belt cleaning device including a wiping portion according to the same first embodiment.

As illustrated in FIGS. 1 and 2, the transport device 5 according to the present embodiment includes: a transporting belt 9 configured to transport the medium P and including a support face 7 configured to support the medium P; a wiper 11 configured to wipe the support face 7; an attachment portion 13 to which the wiper 11 is attached; and a holding portion 15 configured to switch between a pressing state in which the wiper 11 is pressed against the attachment portion 13 and a release state in which the pressure of the wiper 11 against the attachment portion 13 is released.

In addition, the wiper 11 includes a base portion 17 attached to the attachment portion 13. The attachment portion 13 includes an attachment surface 13a that can be brought into contact with at least the base portion 17. Furthermore, either one of the base portion 17 and the attachment portion 13 includes at least one pin 19. The other one includes a hole 21 through which the at least one pin 19 is inserted. The number of holes 21 corresponds to the number of pins 19.

The transport device 5 according to the present embodiment includes a wiping portion 2 that wipes the support face 7 of the transporting belt 9. The wiping portion 2 includes the wiper 11, the attachment portion 13, and the holding portion 15 as basic elements.

The wiping portion 2 is attached to a belt cleaning device 14. In the present embodiment, the wiping portion 2 is attached in a state of being angled relative to the belt cleaning device 14. Specifically, the attachment surface 13a of the attachment portion 13 is angled relative to the Y-axis direction. With this configuration, when the wiper 11 is attached to the attachment portion 13, the wiper 11 is angled relative to the Y-axis direction. The belt cleaning device 14 includes a storage unit 18 configured to store a liquid 16 for cleaning, a brush roller 20, and the wiping portion 2, and is disposed at or around a driving roller 4, which will be described later, of the transporting belt 9 as illustrated in FIG. 1. The wiping portion 2 is supported within the storage unit 18. Specifically, the attachment portion 13 of the wiping portion 2 is fixed at the inner surface of the storage unit 18. As the transporting belt 9 moves over the wiping portion 2, the support face 7 of the transporting belt 9 is wiped by the wiper 11.

Below, each constituent element of the transport device 5 will be described.

Transporting Belt

The transporting belt 9 is an endless belt looped around a driving roller 4 and a driven roller 6 as illustrated in FIG. 1. An adhesive layer 8 is provided at the support face 7 that is an outer peripheral surface of the endless transporting belt 9. The medium P adheres to the adhesive layer 8 with a not-illustrated adhesive member, and in this adhering state, passes through the recording unit 3. The adhesive member is, for example, a pushing roller configured to push the medium P against the support face 7. Through a recording operation by the recording unit 3, an ink is attached on the support face 7 of the transporting belt 9. The belt cleaning device 14 configured to clean the support face 7 on which the ink is attached is disposed at or around the driving roller 4 as described above.

The medium P is a normal recording medium having a sheet shape used to record with an inkjet printer, including paper, fiber, a plastic film, or the like.

Wiper, Hole

Figure 3:
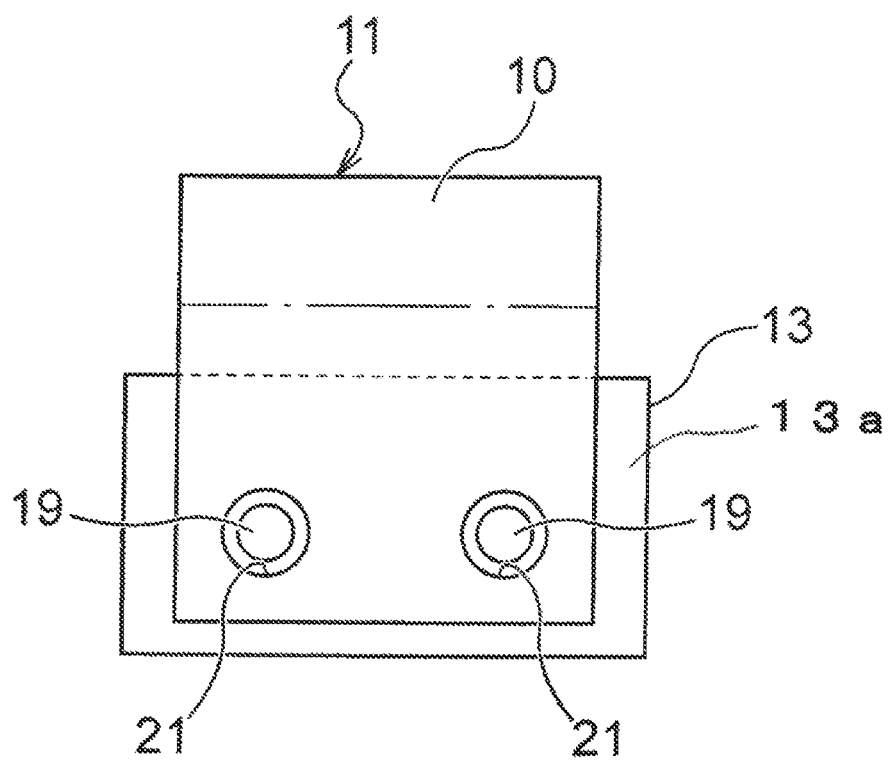
FIG. 3 is a plane view illustrating a portion of a wiper and a pin according to the same first embodiment, in a state where a holding portion is detached.

The wiper 11 has a plate shape, and is made out of a material having elasticity such as a silicon rubber. As illustrated in FIGS. 2 and 3, the wiper 11 includes a base portion 17 attached to the attachment portion 13, and a contact portion 10 disposed at a tip side of the base portion 17 and brought into contact with the support face 7 of the transporting belt 9 to wipe the support face 7. When a direction A represents a direction parallel to the attachment surface 13a and perpendicular to the X-axis direction, the length of the wiper 11 in the X-axis direction is larger than the length of the wiper 11 in the direction A. In the present embodiment, the contact portion 10 is formed so as to have a shape having a width reducing toward the tip when viewed from the side in the X-axis direction. However, it is needless to say that the shape is not limited to this width reducing shape. The length of the wiper 11 in the X-axis direction is equal to or slightly longer than the width size, in the X-axis direction, of the transporting belt 9 serving as the target of wiping. Note that the wiper may be referred to as a blade or a wiper blade in the present technical field.

In the present embodiment, two circular holes 21, 21 extend through the base portion 17 of the wiper 11. Pins 19 of the attachment portion 13, which will be described later, are inserted through each of these two holes 21, 21.

Attachment Portion, Pin

Figure 4:
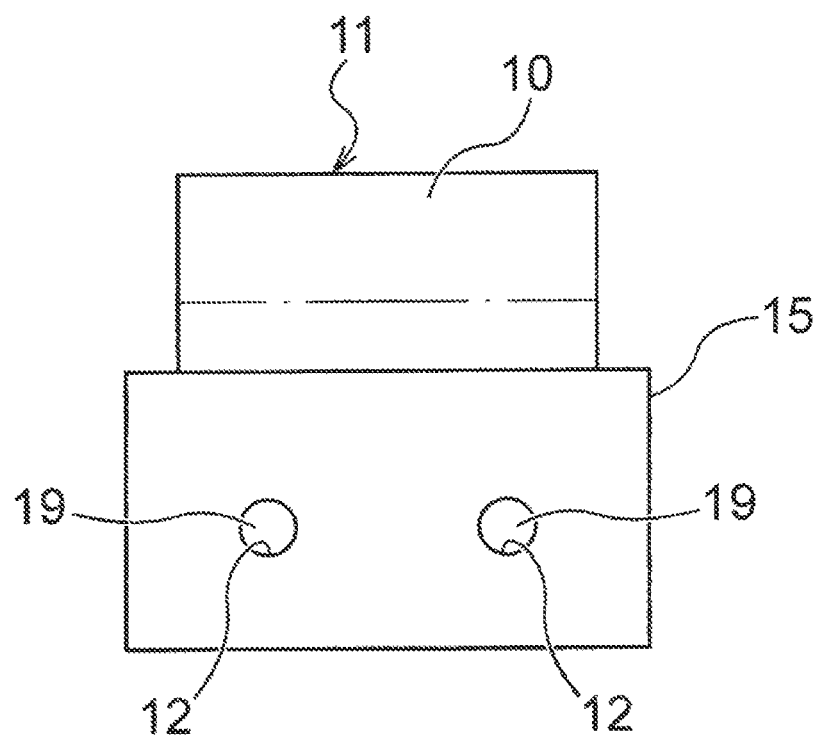
FIG. 4 is a plane view illustrating a portion of the wiper and the pin according to the same first embodiment, in a state where the holding portion is attached.

The attachment portion 13 is a portion to which the wiper 11 is attached. In addition, in the present embodiment, the attachment portion 13 includes two pins 19, 19. In the present embodiment, the pins 19, 19 have a cylindrical shape as illustrated in FIGS. 2, 3, and 4. Note that the shape of the pins 19, 19 is not limited to the cylindrical shape, and may have a prism shape or the like. The shape is not limited to a particular shape.

In addition, as illustrated in FIG. 2, the lengths of the pins 19, 19 are formed so as to have a dimension that allows the pin 19, 19 to penetrate through both the hole 21, 21 of the wiper 11 and a hole 12, 12 of the holding portion 15, which will be described later. Note that the pins 19, 19 are only necessary to have a length that reaches at least the inside of the hole 21, 21 of the wiper 11, and the pins 19, 19 may have a length that does not penetrate through the holding portion 15. When the lengths of the pins 19, 19 are lengths that do not penetrate through the holding portion 15, the holding portion 15 may not have any hole 12, 12.

The present embodiment employs a structure in which the attachment portion 13 includes two pins 19, 19, and the base portion 17 of the wiper 11 includes two holes 21, 21. However, the present embodiment is not limited to this embodiment. For example, it may be possible to employ a structure in which the attachment portion 13 includes two holes 21, 21, and the base portion 17 of the wiper 11 includes two pins 19, 19. Note that the number of the pins 19 or the number of the holes 21 is not limited to two. It is only necessary that the number of the pins 19 or the number of the holes 21 is at least one. That is, the number of pins 19 or the number of holes 21 may be one or may be three or more.

Modification Example of Pin

Figure 5:
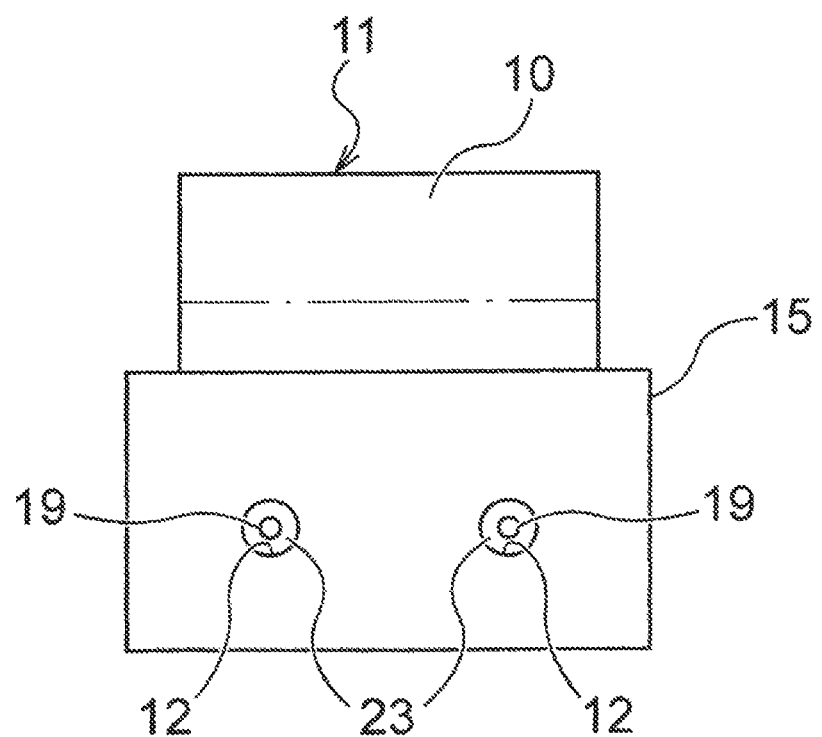
FIG. 5 is a plane view illustrating a portion of the wiper and the pin according to the same first embodiment, which serves as a modification example of the pin.

As illustrated in FIG. 5, the pin 19, 19 may include a taper portion 23. It is preferable that the taper portion 23 has a conical frustum shape when the pin 19, 19 has a cylindrical shape, and the taper portion 23 has a pyramid frustum shape when the pin 19, 19 has a prism shape.

The present modification example makes it easy to insert the pin 19, 19 through the hole 21, 21 when the taper portion 23 has a width reducing shape. In addition, when the taper portion 23 has a width increasing shape, it is possible to prevent the pin 19, 19 from accidentally coming out of the hole 21, 21. Thus, it is possible to suppress falling of the wiper 11 from the attachment portion 13 under its own weight.

Holding Portion

As described above, the holding portion 15 is attached to the attachment portion 13 so as to be able to switch between the pressing state in which the wiper 11 is pressed against the attachment portion 13 and the release state in which the pressure of the wiper 11 against the attachment portion 13 is released. In the present embodiment, the holding portion 15 is attached to the attachment portion 13 with a fastening member such as a screw or the like, which is not illustrated. The "pressing state" is configured to be achieved in a state where the holding portion 15 is attached to the attachment portion 13, and the "release state" is configured to be achieved in a state where the fastening member is removed.

In the present embodiment, the holding portion 15 includes two holes 12, 12, as illustrated in FIGS. 2 and 4. As described above, the tip portions of the two pins 19, 19 provided at the attachment portion 13 are inserted through the two holes 12, 12 provided at the holding portion 15 side. These two holes 12, 12 are formed so as to have substantially the same diameter as the pins 19, 19. In other words, the pins 19, 19 are inserted through both the holes 21, 21 of the wiper 11 and the holes 12, 12 of the holding portion 15.

Figure 6:
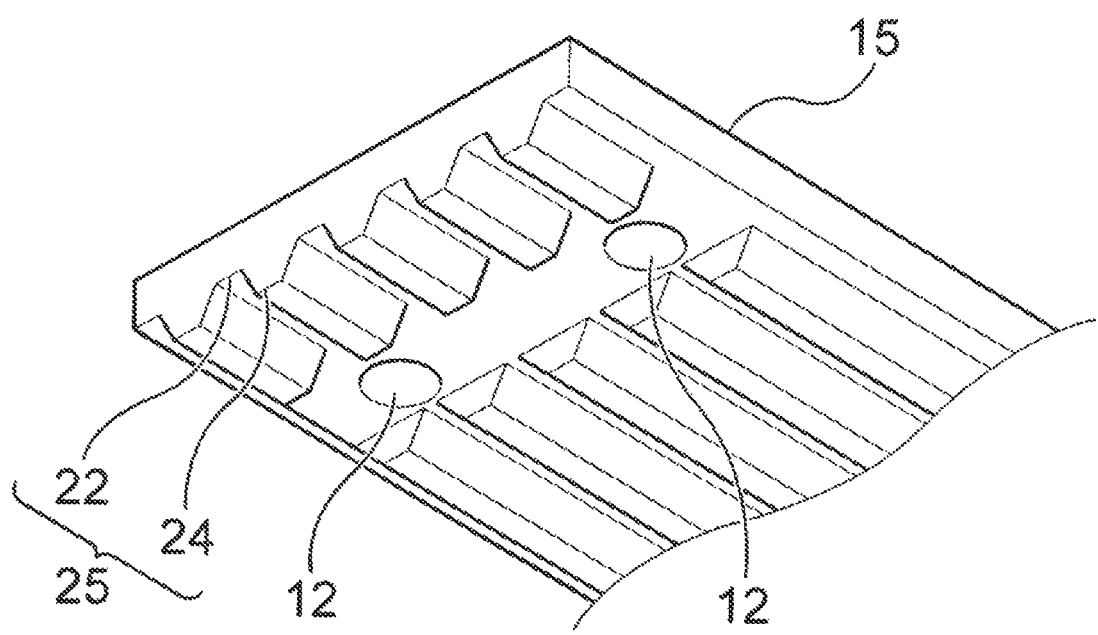
FIG. 6 is a perspective view illustrating the main components of the holding portion according to the same first embodiment.
Figure 7:
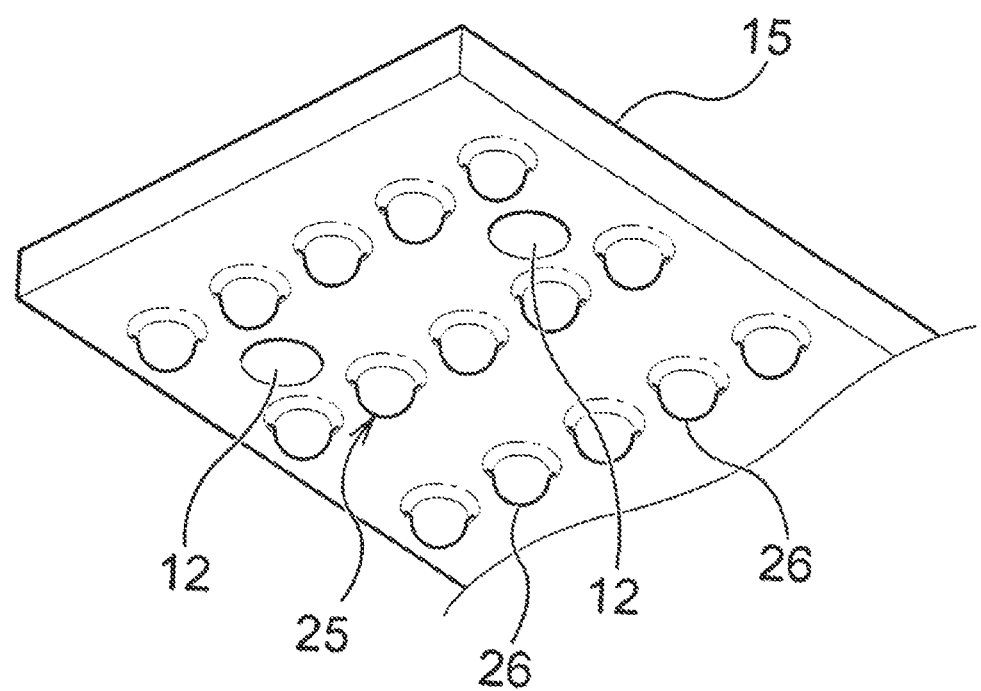
FIG. 7 is a perspective view illustrating the main components of the holding portion according to the same first embodiment.

Furthermore, in the present embodiment, as illustrated in FIGS. 6 and 7, a portion of the holding portion 15 that is in contact with the base portion 17 includes a protrusion and recession 25. This protrusion and recession 25 includes, for example, a plurality of protruding portions and a recessed portion formed between adjacent two protruding portions. The protrusion and recession 25 is provided to reduce the contact surface with the base portion 17 of the wiper 11, thereby suppressing adherence of the holding portion 15 to the wiper 11. The protruding portion of the protrusion and recession 25 can be brought into contact with a portion of the base portion 17 where no hole 21, 21 is provided. The specific structure of the protrusion and recession 25 includes a structure including a long groove 22 and a ridge 24 formed in parallel to each other as illustrated in FIG. 6, a structure including a plurality of projecting portions 26 having a half sphere shape and arranged in vertical and horizontal directions as illustrated in FIG. 7, and the like.

Description of Operation of First Embodiment

Next, with reference to FIGS. 2 to 7, description will be made of a case where the wiper 11 is replaced in the recording device 1 including the transport device 5 according to the first embodiment.

First, a state that allows an operator to access the wiper 11 of the wiping portion 2 is created. Then, the fastening of the fastening member is released to detach the attachment portion 13 from the holding portion 15 (FIG. 3). This brings the wiper 11 into the release state from the pressing state with the holding portion 15. In this release state, the pins 19, 19 of the attachment portion 13 are still inserted through the holes 21, 21 of the wiper 11. Thus, the wiper 11 does not accidentally fall from the attachment portion 13.

The operator detaches the wiper 11 from the pins 19, 19, and attaches a new wiper 11 to the attachment portion 13. In other words, attachment is performed in a manner such that the pins 19, 19 are inserted through the holes 21, 21 of the new wiper 11. In this state, the holding portion 15 is attached to the attachment portion 13 using the fastening member. With this operation, the replacement operation for the wiper 11 ends.

Description of Effects of First Embodiment (1) With the present embodiment, at least one pin 19, 19 is provided at either one of the base portion 17 of the wiper 11 and the attachment portion 13, and the pin 19, 19 is inserted through the hole 21, 21 provided in the other one. This makes the pin 19, 19 caught at the hole 21, 21, which makes it possible to suppress falling of the wiper 11 under the wiper 11's own weight even if the holding portion 15 is switched into the release state at the time of replacing the wiper 11. This makes it possible to suppress a deterioration of workability of replacing the wiper.

(2) In addition, when the holding portion 15 is switched into the release state, the wiper 11 may adhere to the holding portion 15 depending on a type of a material that constitutes the wiper 11. In a case of the present embodiment, the holding portion 15 includes the protrusion and recession 25, and the protruding portion of this protrusion and recession 25 is brought into contact with the base portion 17. This protrusion and recession 25 makes it possible to reduce the contact surface of the holding portion 15 and the base portion 17. With this configuration, the wiper 11 is less likely to adhere to the holding portion 15. Thus, it is possible to suppress falling of the wiper 11 due to detachment from the holding portion 15 resulting from the adherence. For example, it is possible to prevent that, after a predetermined period of time elapses since a user separates the holding portion 15 from the attachment portion 13, the wiper 11 detaches from the holding portion 15, and then falls onto a location where the user does not intend to fall.

Note that the height of the protruding portion of the protrusion and recession 25 may be less than the thickness of the base portion 17, or may be equal to or greater than the thickness of the base portion 17. In the former case, when the holding portion 15 is switched into the pressing state and the wiper 11 is in close contact with the attachment surface 13a, the protruding portion is more likely to enter the wiper 11 in a case where the wiper 11 is made out of a material having elasticity. This makes it possible to prevent the wiper 11 from lifting from the attachment surface 13a when the holding portion 15 is switched into the pressing state. Thus, it is possible to suppress a deterioration in the effect of gripping the wiper 11 with the attachment portion 13 and the holding portion 15 as a result of the wiper 11 being less likely to be in close contact with the attachment surface 13a. In the latter case, even in a case where the wiper 11 is made out of a material having elasticity, the wiper 11 is more likely to lift from the attachment surface 13a when the holding portion 15 is switched into the pressing state. In this case, by adjusting the number of protruding portions of the protrusion and recession 25, it is possible to reduce the contact surface of the attachment surface 13a and the base portion 17 while maintaining a desired level of the effect of gripping the wiper 11 with the attachment portion 13 and the holding portion 15. With this configuration, even when the wiper 11 is made out of a material such as butyl rubber, the wiper 11 is less likely to adhere to the attachment surface 13a, which makes it easy to detach the wiper 11 from the attachment surface 13a.

Second Embodiment

Next, a transport device 5 according to a second embodiment of the present disclosure will be described in detail with reference to FIGS. 8 to 10.

In the transport device 5 according to the present embodiment, two pins 19, 19 each include a first pin 27 and a second pin 29. That is, each of the pins 19 includes the first pin 27 and the second pin 29. In addition, a pair of the first pin 27 and the second pin 29 are inserted through each hole 21 of the two holes 21, 21. The configuration in which the first pin 27 and the second pin 29 are provided at the attachment portion 13 and the hole 21 is provided in the base portion 17 is similar to that in the first embodiment.

Furthermore, in a state where the pair of the first pin 27 and the second pin 29 are inserted through the hole 21, the attachment portion 13 is attached so as to press the inner wall that constitutes the hole 21 with pressing force in directions differing from each other. Specifically, the pair of first pin 27 and the second pin 29 are each comprised of an elastic body made, for example, of resin. In addition, the distance between the tip portion of the first in 27 and the tip portion of the second pin 29 is configured so as to be slightly larger than the inner diameter of the hole 21 in order to generate the pressing force. Thus, the pressing force is generated by first restoring force based on elasticity of the first pin 27 and second restoring force based on elasticity of the second pin 29. For example, one of the pair of arrows in FIG. 8 indicates the first restoring force, and the other one indicates the second restoring force in a direction opposite to the direction of the first restoring force.

Here, the "directions differing" are not limited to directions opposite to each other and along a straight line connecting the first pin 27 and the second pin 29. For example, in FIG. 10, the directions of the arrows indicating directions of the pressing forces may be the vertical direction, rather than the diagonal directions indicated by the arrows in FIG. 10. For example, the "directions differing" include a mode in which the line of action of the first restoring force and the line of action of the second restoring force are parallel to each other and do not align with each other, and also includes a mode in which the line of action of the first restoring force and the line of action of the second restoring force intersect each other.

Figure 8:
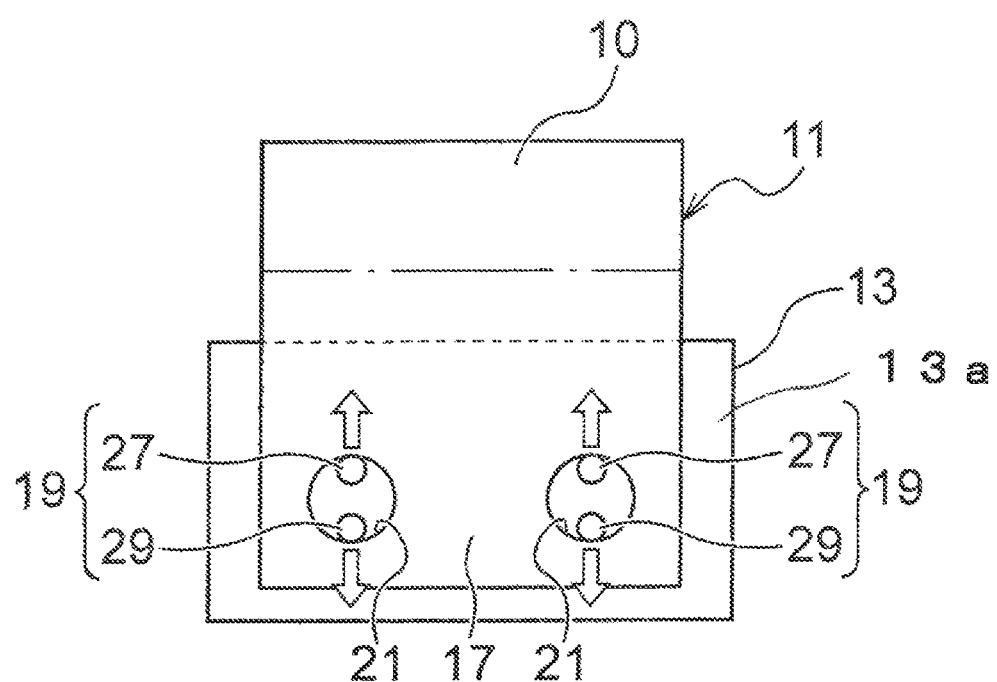
FIG. 8 is a plan view illustrating a portion of a wiper according to a second embodiment of the present disclosure.

FIG. 8 illustrates a structure in which the first pin 27 and the second pin 29 are disposed so as to be spaced apart from each other in the direction A. The pressing force is directed in the arrows in FIG. 8.

Figure 9:
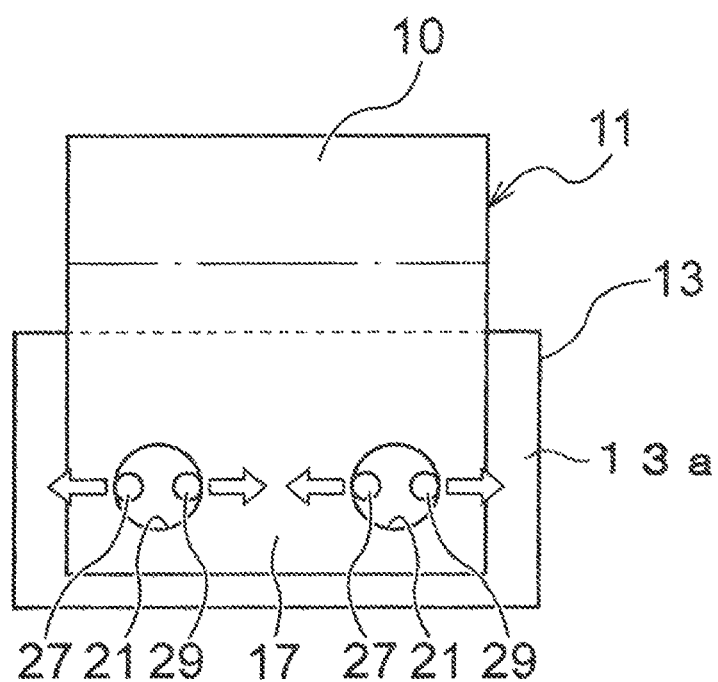
FIG. 9 is a plan view illustrating a portion of the wiper and a pin according to the second embodiment of the present disclosure.

FIG. 9 illustrates a structure in which the first pin 27 and the second pin 29 are disposed so as to be spaced apart from each other in the horizontal direction (X-axis direction). The pressing force is directed in the direction of the arrows in FIG. 9, that is, in the horizontal direction.

Figure 10:
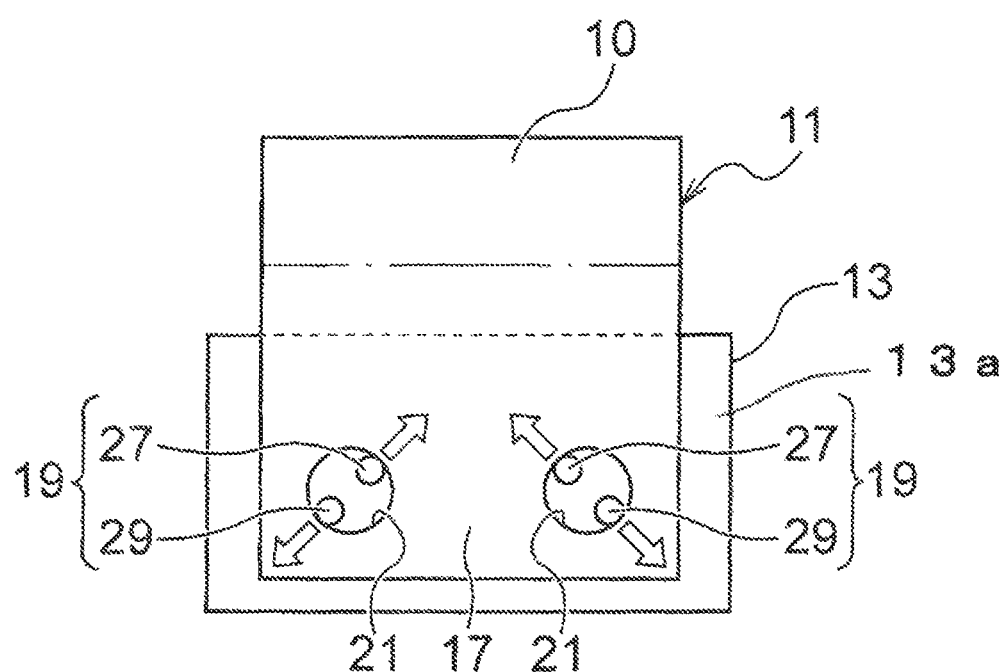
FIG. 10 is a plan view illustrating a portion of the wiper and the pin according to the second embodiment of the present disclosure.

FIG. 10 illustrates a structure in which the first pin 27 and the second pin 29 are disposed so as to be spaced apart from each other in a diagonal direction. The pressing force is directed toward the arrow in FIG. 10.

The other configurations are similar to those in the first embodiment. Thus, the same reference characters are attached to the same portions, and explanation thereof will not be repeated. In addition, explanation of operation and effects similar to those of the first embodiment will not be made.

Description of Effects of Second Embodiment

With the present embodiment, in a state where the first pin 27 and the second pin 29 are inserted through the hole 21, the first pin 27 and the second pin 29 press the inner wall that constitutes the hole 21 with pressing force in directions differing from each other. This makes it possible to further suppress falling of the wiper 11 under its own weight even when the holding portion 15 is switched into the release state at the time of replacing the wiper 11. Thus, it is possible to further suppress a deterioration of workability of replacing the wiper.

Third Embodiment

Next, a transport device 5 according to a third embodiment of the present disclosure will be described in detail with reference to FIGS. 11 and 12.

In the transport device 5 according to the present embodiment, the holding portion 15 includes a slide portion 35 that can slidably move relative to the attachment portion 13, and a protruding portion 31 provided at a portion of the slide portion 35 that is opposed to the base portion 17. The protruding portion 31 is configured to move to a position that enables the base portion 17 to be pressed against the attachment portion 13 with the slide portion 35 sliding and moving. Here, the protruding portion 31 is formed so as to have a convex spherical shape. However, the shape is not limited to this convex spherical shape. For example, it may be possible to use a semi-cylindrical surface shape elongated in the width direction of the wiper 11 or the like.

Figure 12:
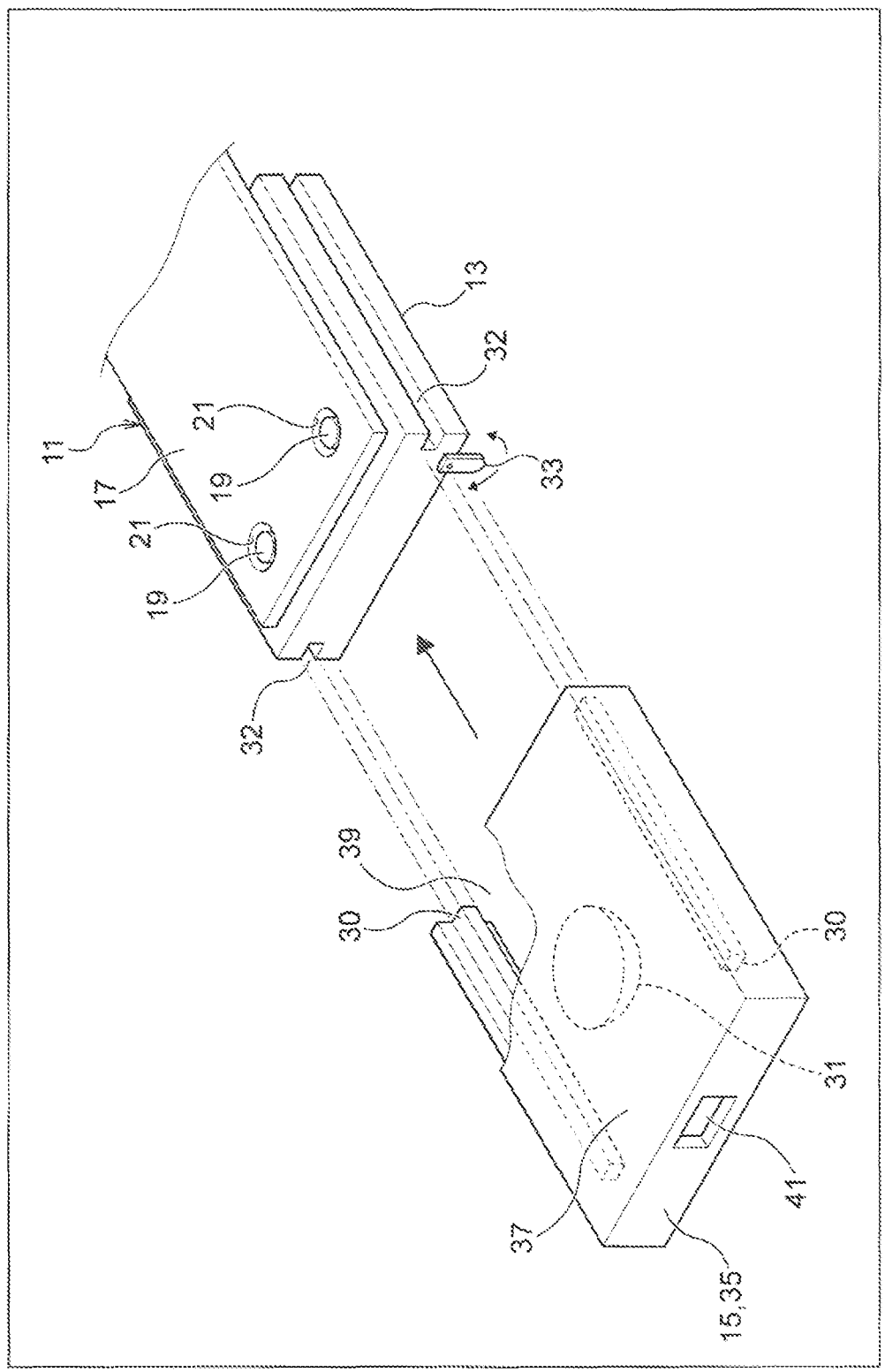
FIG. 12 is an exploded perspective view before a holding portion according to the same third embodiment is mounted at a baser portion in a slide manner.

In the present embodiment, as illustrated in FIG. 12, the slide portion 35 includes a pair of rails 30, 30 that are parallel to the sliding direction. In addition, the attachment portion 13 also includes a pair of long grooves 32, 32 that are parallel to the sliding direction. The slide portion 35 is configured such that the pair of rails 30, 30 fit into the pair of long grooves 32, 32 of the attachment portion 13 to slide.

Furthermore, in the present embodiment, a lock portion 33 is provided that the slide portion 35 is locked at the attachment portion 13 in a state where the slide portion 35 is slidably moved to the maximum extent in the direction A relative to the attachment portion 13. The lock portion 33 is provided at a position that corresponds to a position where the slide portion 35 is locked at the attachment portion 13. The state in FIG. 11 corresponds to the state where the slide portion 35 is slidably moved to the maximum extent relative to the attachment portion 13, and the lock portion 33 is disposed at the locking position.

The lock portion 33 according to the present embodiment is configured with a small piece that rotates, and rotates to be able to move between the locking position and a release position. Note that, as for the lock portion 33, the rotating structure of the small piece is merely one example, and structure is not limited to this. It is needless to say that it may be possible to use a snap-fit structure that can lock and disengage.

In addition, in the present embodiment, as described above, the belt cleaning device 14 includes the storage unit 18 configured to store the liquid 16 used to clean the support face 7 of the transporting belt 9, and the attachment portion 13 is supported within the storage unit 18. Furthermore, the slide portion 35 is configured so as to include a cover portion 37 that covers at least one pin 19, 19 and the hole 21, 21.

In addition, as illustrated in FIG. 7, the cover 37 includes a first opening 39 that the wiper 11 enters when slidably moving relative to the attachment portion 13, and also includes a second opening 41 disposed at a position opposite from the first opening 39 in a direction of sliding and moving relative to the attachment portion 13. The second opening 41 is configured to be disposed below the first opening 39 in the gravitational direction.

Description of Effects of Third Embodiment (1) With the present embodiment, at the time of replacing the wiper 11, it is possible to press the base portion 17 against the attachment portion 13 only by a user sliding and moving the slide portion 35. This makes it possible to improve the workability of replacing a wiper.

(2) In addition, the slide portion 35 is locked in a state where it is slidably moved to the maximum extent relative to the attachment portion 13, which makes the slide portion 35 less likely to fall.

(3) Furthermore, since the slide portion 35 includes the cover portion 37 that covers at least one pin 19, 19 and the hole 21, 21, it is possible to prevent that the liquid 16 stored in the storage unit 18 is attached to the base portion 17, and dirt enters a gap between the pin 19, 19 and the hole 21, 21 to make the wiper 11 or the pin 19, 19 get dirty.

(4) In addition, the cover 37 includes the first opening 39 that the wiper 11 enters and the second opening 41 disposed at a position opposite from the first opening 39, and the second opening 41 is disposed below the first opening 39 in the gravitational direction. With this configuration, the liquid 16 that has been used to clean the support face 7 moves along the wiper 11 and flows through the second opening 41 into the storage unit 18. This makes it possible to prevent the liquid 16 from staying within the cover 37. Thus, it is possible to prevent the inside of the cover 37 from getting dirty.

Other Embodiments

The recording device 1 including the transport device 5 according to the embodiment of the present disclosure basically has the configuration as described above. However, it is needless to say that, for example, partial modification can be made to the configuration or some configuration may not be provided without departing from the main point of the present disclosure.

Figure 11:
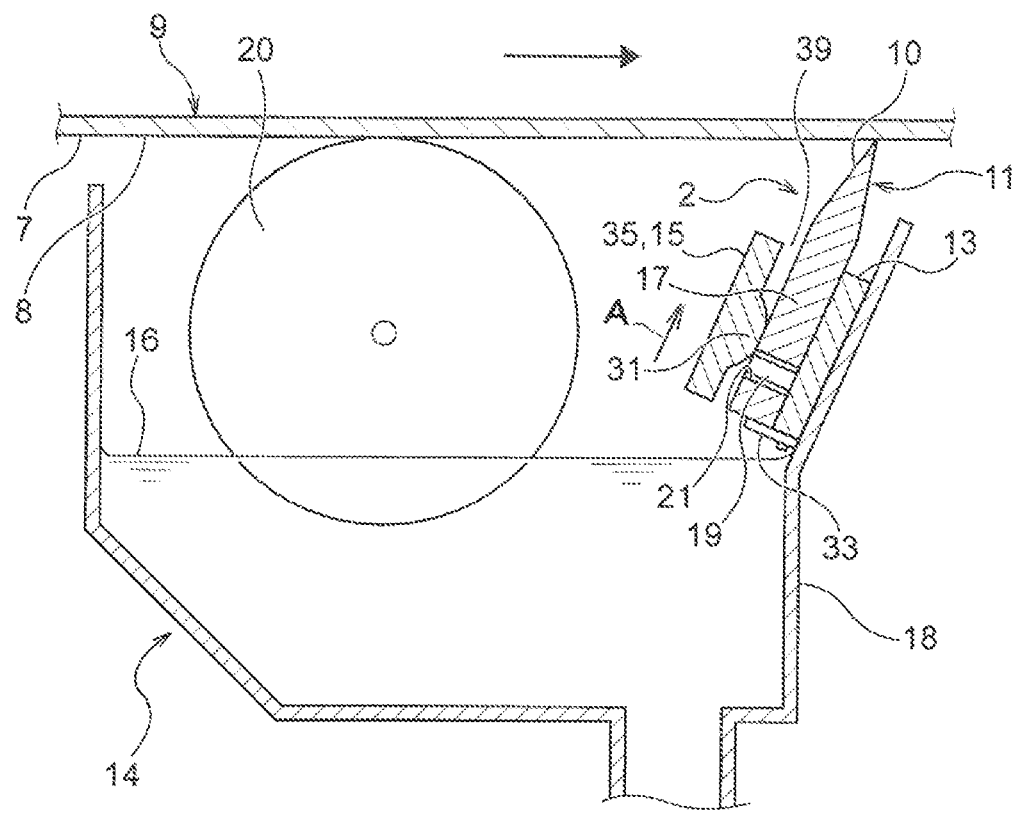
FIG. 11 is a cross-sectional view schematically illustrating a belt cleaning device including a wiping portion according to a third embodiment of the present disclosure.

In the third embodiment, the "state where the slide portion 35 is slidably moved to the maximum extent relative to the attachment portion 13" is not limited to the position of the slide portion 35 illustrated in FIG. 11. That is, the slide portion 35 may be locked at the attachment portion 13 in a state where it is slidably moved to the maximum extent relative to the attachment portion 13 in a direction opposite to the direction A. In addition, the slide portion 35 may be locked at the attachment portion 13 in a state where it is slidably moved to the maximum extent relative to the attachment portion 13 in a direction intersecting the direction A. In these cases, the direction in which the pair of rails 30, 30 and the long grooves 32, 32 extend may be changed on an as-necessary basis depending on design of a direction in which the slide portion 35 moves. In addition, the position where the small piece of the lock portion 33 is provided or arrangement of the snap-fit mechanism may be changed on an as-necessary basis.

What is claimed is:

1. A transport device, comprising:
a transporting belt including a support face configured to support a medium, the transporting belt being configured to transport the medium;
a wiper configured to wipe the support face;
an attachment portion to which the wiper is attached; and
a holding portion configured to switch between a pressing state in which the wiper is pressed against the attachment portion and a release state in which the pressure of the wiper against the attachment portion is released, wherein
the wiper includes a base portion attached to the attachment portion,
either one of the base portion and the attachment portion includes at least one pin, the other one includes a hole through which the at least one pin is inserted, and
a portion of the holding portion that is in the contact with the base portion includes a protrusion and a recession, the protrusion separating the holding portion from contact with the recession.

2. The transport device according to claim 1, wherein
the pin includes a first pin and a second pin configured to be inserted through the hole that is a single hole,
the first pin and the second pin are provided at the attachment portion,
the hole is provided in the base portion, and
in a state where the first pin and the second pin are inserted through the hole, the first pin and the second pin press an inner wall that constitutes the hole, in directions differing from each other.

3. The transport device according to claim 1, wherein the holding portion includes:
a slide portion configured to slidably move relative to the attachment portion; and
a protruding portion provided at a portion of the slide portion that is opposed to the base portion, wherein,
as the slide portion slidably moves, the protruding portion moves to a position for pressing the base portion against the attachment portion.

4. The transport device according to claim 3, wherein, in a state where the slide portion is slidably moved to the maximum extent relative to the attachment portion, the slide portion is locked at the attachment portion.

5. The transport device according to claim 3, comprising:
a storage unit configured to store a liquid used to clean the support face, wherein
the attachment portion is supported inside the storage unit, and
the slide portion includes a cover portion with which the at least one pin and the hole are covered.

6. The transport device according to claim 5, wherein
the cover includes
a first opening that the wiper enters when slidably moving relative to the attachment portion, and
a second opening disposed at an opposite side from the first opening in a direction of the slide movement relative to the attachment portion, wherein
the second opening is disposed below the first opening in a gravitational direction.

7. The transport device according to claim 1, wherein the at least one pin includes a taper portion.

* * * * *